United States Patent
Lai (10) Patent No.: US 7,652,958 B2
(45) Date of Patent: Jan. 26, 2010

(54) TRACK LOCKING METHOD FOR OPTICAL PICKUP HEAD

(76) Inventor: Ronnie Lai, 8F, 533, Chung-Cheng Rd., Hsin-Tien, Taipei (TW)

( * ) Notice: Subject to any disclaimer, the term of this patent is extended or adjusted under 35 U.S.C. 154(b) by 899 days.

(21) Appl. No.: 11/039,309

(22) Filed: Jan. 20, 2005

(65) Prior Publication Data
US 2005/0157612 A1 Jul. 21, 2005

(30) Foreign Application Priority Data
Jan. 20, 2004 (TW) .............................. 93101496 A (51) Int. Cl.
*G11B 7/00* (2006.01)
(52) U.S. Cl. ................. 369/44.32; 369/59.11
(58) Field of Classification Search .......... None
See application file for complete search history.

(56) References Cited

U.S. PATENT DOCUMENTS

| | | | | |
|---|---|---|---|---|
| 4,365,324 A * | 12/1982 | Michaelis | ................ | 369/44.32 |
| 5,121,374 A * | 6/1992 | Barton et al. | ............ | 369/44.29 |
| 5,768,229 A * | 6/1998 | Ikeda | ....................... | 369/44.28 |
| 6,452,883 B2 * | 9/2002 | Chan | ....................... | 369/53.14 |
| 7,190,644 B2 * | 3/2007 | Shen | ....................... | 369/44.28 |
| 2006/0203631 A1 * | 9/2006 | Wu et al. | ................. | 369/44.26 |

FOREIGN PATENT DOCUMENTS

| JP | 07-111035 | 4/1995 |
|---|---|---|
| JP | 2003/196849 | 7/2003 |

* cited by examiner

*Primary Examiner*—Joseph H Feild
*Assistant Examiner*—Parul Gupta
(74) *Attorney, Agent, or Firm*—Perkins Coie LLP (57) ABSTRACT

A track locking method for use in an optical disc device comprising a pickup head. The pickup head comprises an actuator equipped with an optical lens controlling a laser focus on the optical disc. The pickup head is moved to a predetermined position. A track error signal in the optical disc device is detected. Whether a flicker frequency of the track error signal is less than a threshold is determined. Based on the determination, the actuator is provided with a braking force to pre-deviate the optical lens, and a track locking signal is delivered to the actuator and control parameters of the pickup head is stored to lock the laser focus on a destination track of the optical disc.

16 Claims, 9 Drawing Sheets

TRACK LOCKING METHOD FOR OPTICAL PICKUP HEAD

BACKGROUND

The invention relates to a track locking method for an optical pickup head, in particular, to a track locking method that pre-deviates an optical lens on the actuator before locking a track based on the flicker frequency of a track error signal detected by the optical pickup head.

Conventionally, the surface and axis of an optical disc may not be uniformly distributed, and may suffer from eccentricity producing periodic radial and axial oscillations. Radial oscillations induce track flicker, and axial oscillations affect focus of the laser of the optical pickup head. A track locking mechanism is thus desirable to accurately focus on the destination track.

Figure 1:
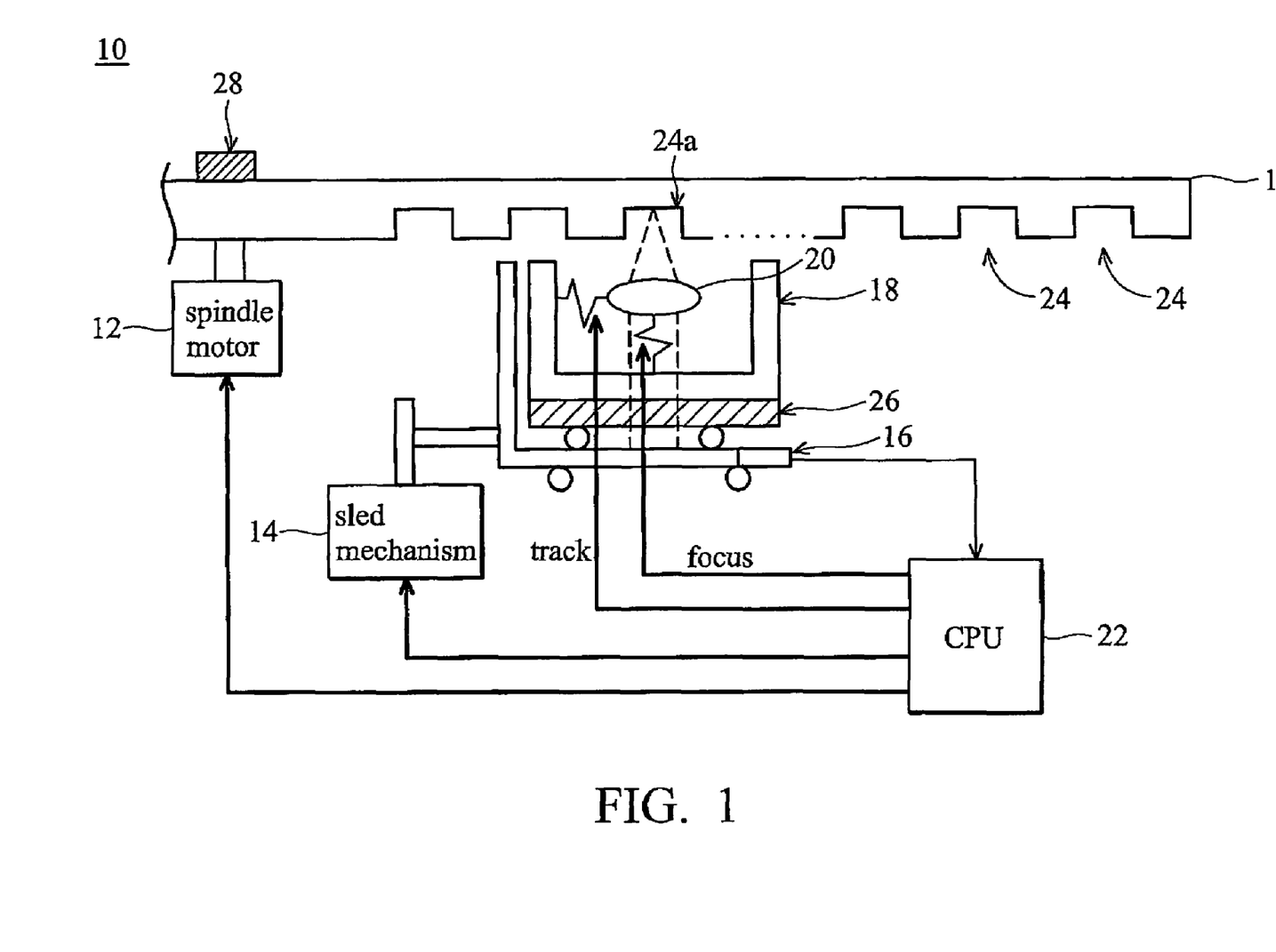
FIG. 1 is a block diagram of a conventional optical disc device.

FIG. 1 shows a conventional optical disc device. Optical disc 11 is driven by a spindle motor 12, and a pickup head (PUH) 16 comprising an actuator 26 is borne by a sled mechanism 14. The actuator 26 is equipped with an optical lens 20 that focuses the laser. The optical lens 20 is kept in the center of a case 18 such that physical impact can be avoided. A CPU 22 coordinates operation of the described components.

The optical disc 11 comprises a plurality of tracks 24, and through PUH 16, data located at the destination track 24a is read. This operation, referred to as track seeking, is accomplished by a sled mechanism 14 moving the PUH 16 substantially above the destination track 24a, that is, a predetermined position. Thereafter, track locking is executed by an actuator 26. The actuator 26 accurately and rapidly tunes the position of the optical lens 20 with incremental axial and radial adjustments. The actuator receives a track locking signal to control the radial movement, and a focus signal to control the axial movement.

Figure 2:
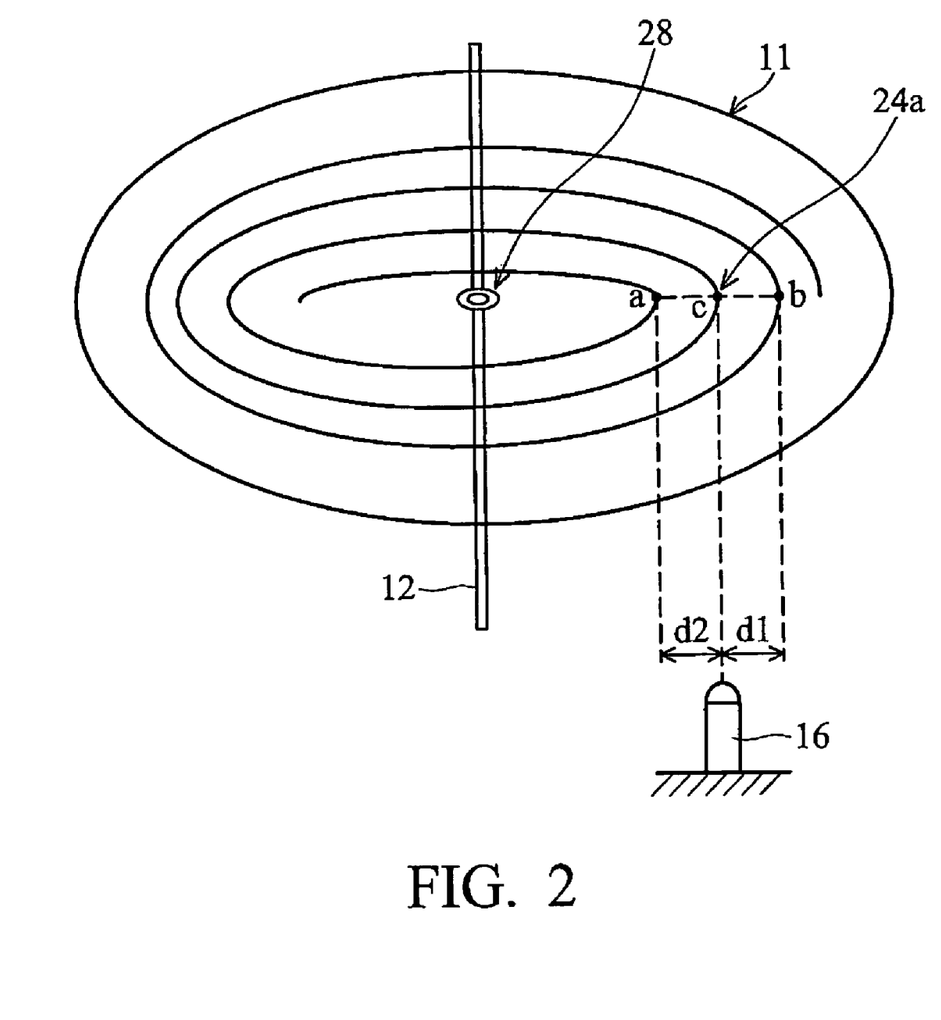
FIG. 2 shows run-out effect of an optical disc.

FIG. 2 shows the position of the PUH 16. Before track locking, the PUH 16 is distributed around point c, vibrating between point a and b due to disc deviation (This phenomenon, so called "run-out effect"). d1 and d2 denote the distance therebetween, substantially identical. The relative speed between the PUH 16 and the optical disc 11 is minimal at point a and b, and is maximal at point c. Conventionally, track locking is not executed until the relative speed therebetween is less than a threshold calculated from a track error signal. The flicker frequency of the track error signal, such as 13 k per second, is proportional to the relative speed, such that the track locking can be based thereon. The actuator 26 is controlled by a track locking signal to lock the optical lens 20 at point a or b.

Figure 3A:
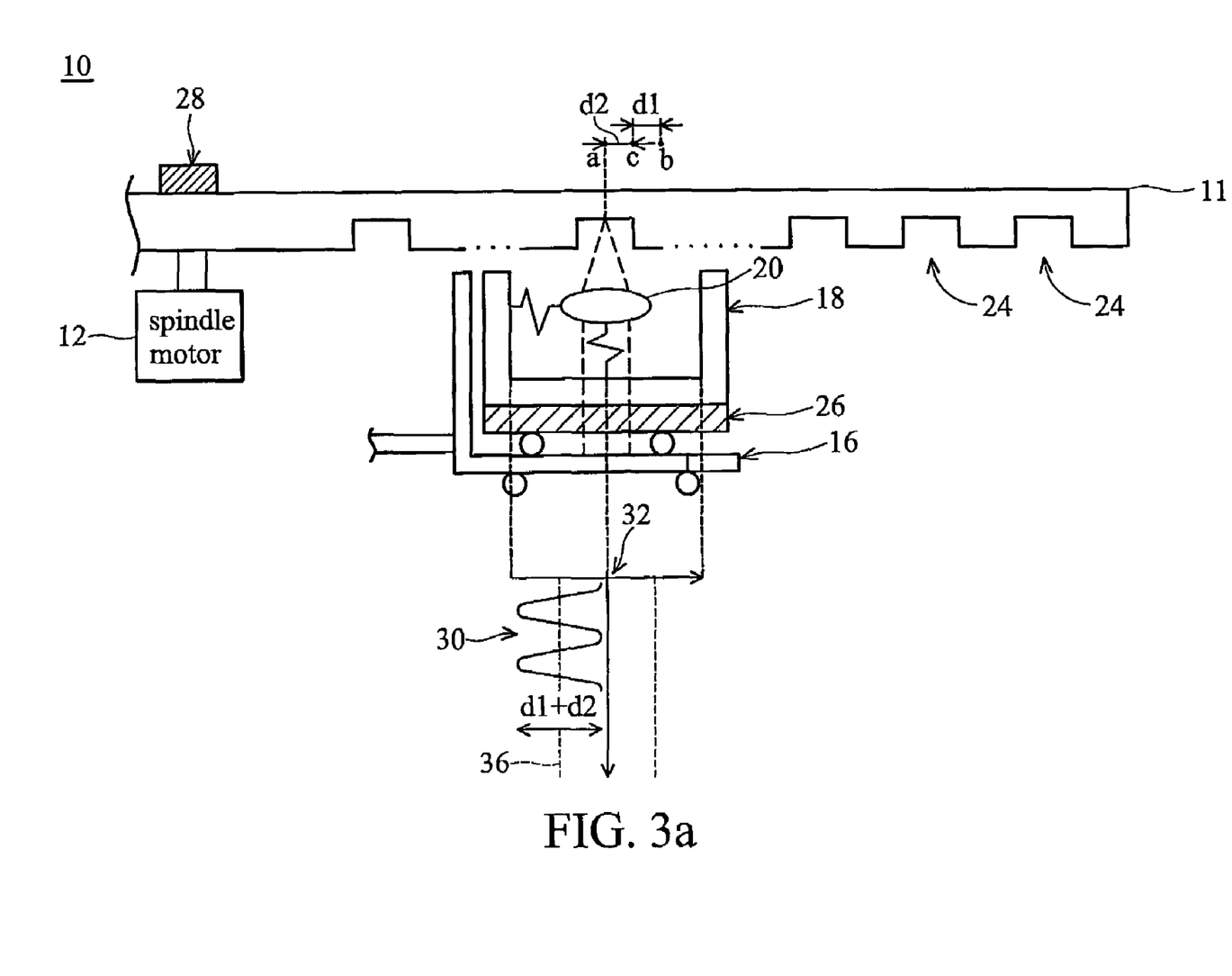
FIG. 3a and FIG. 3b show inward deviation in a conventional optical disc device.
Figure 3B:
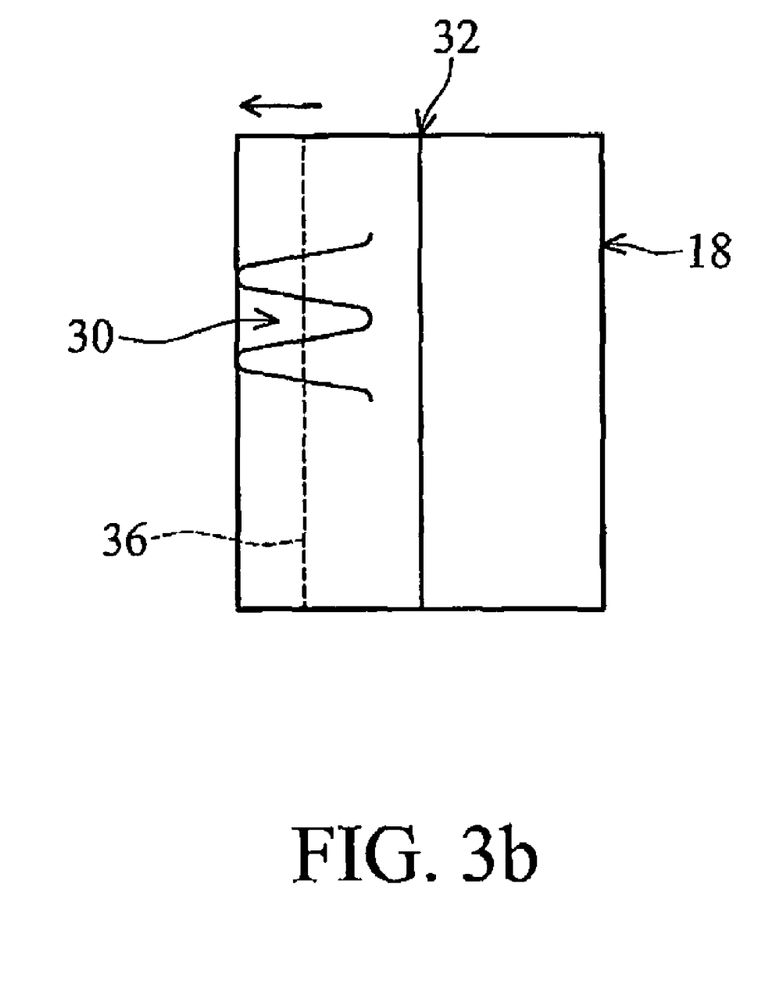
Figure 4A:
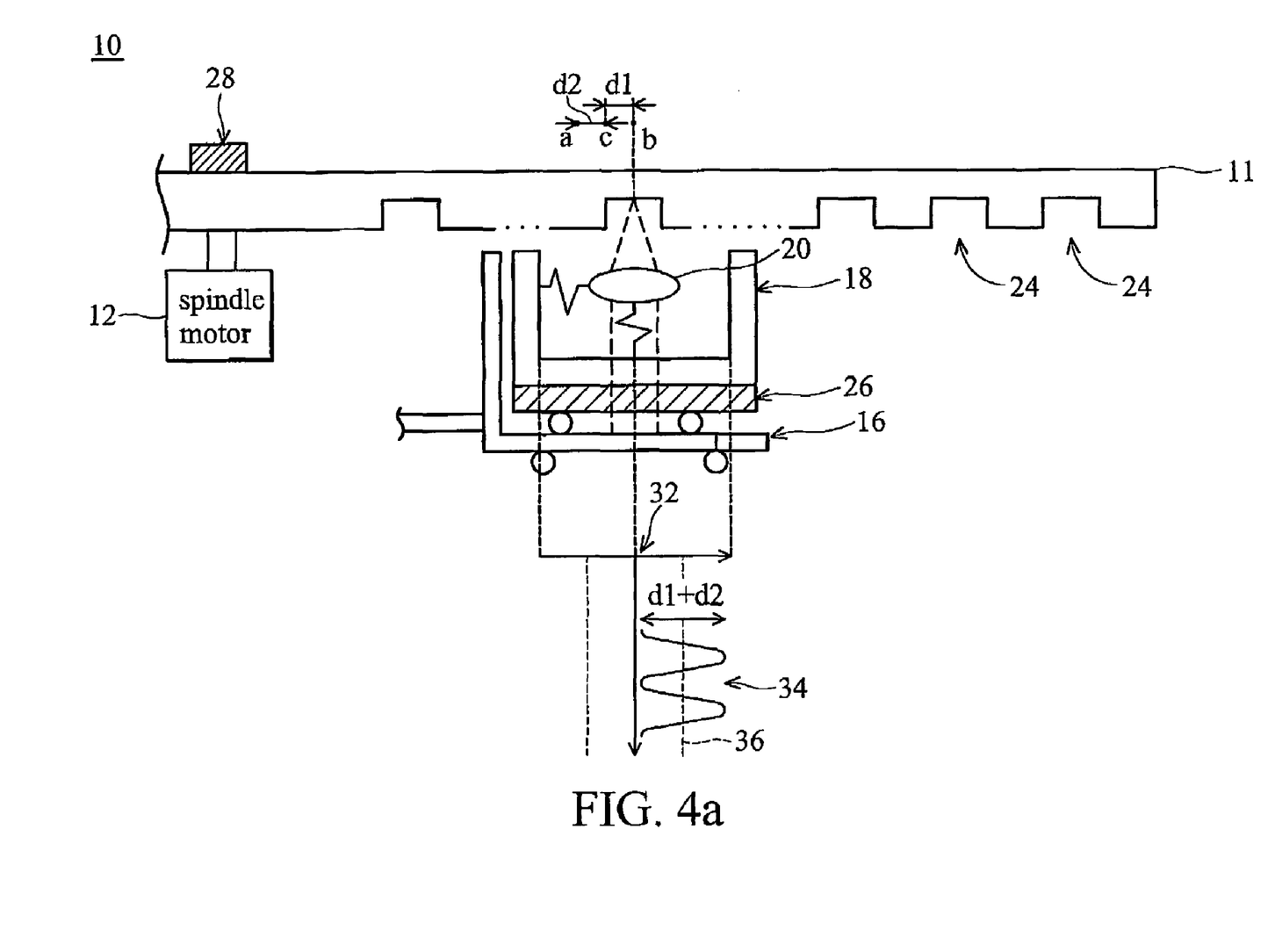
FIG. 4a and FIG. 4b show outward deviation in a conventional optical disc device.
Figure 4B:
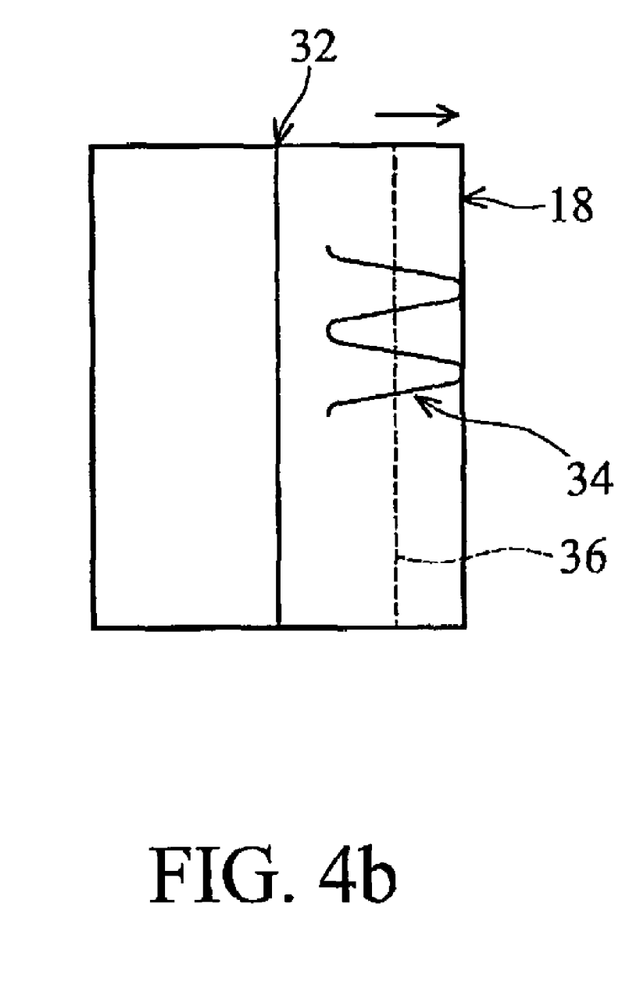

FIGS. 3a and 3b show the movement of the optical lens 20. Initially, the optical lens 20 is in the case center 32, locked on point a of the optical disc 11, generating vibration 30, in which the vibration center 36 deviates from the case center 32. When another track seek and lock take place, because the actuator 26 responds faster than the sled mechanism 14, the optical lens 20 may complete the next track locking before the sled mechanism 14 moves to the proper position. As a result, inward deviation from the case center 32 increases, finally contacting the wall of case 18, inducing unexpected problems. Similarly, in another example, FIGS. 4a and 4b show the movement of the optical lens 20. The optical lens 20 may lock on the point b, with outward deviation also inducing the same problem. This phenomenon means that the PUH 16 is not always at case center 32 when track is locked, comprising two cases, inward deviation and outward deviation. When the optical disc device receives a sudden impact, which causes actuator 26 to lose a fix on destination track 24a, and data reading process is interrupted, such that another track seek and lock are required.

SUMMARY

In view of the foregoing description, an embodiment of the invention provides a track locking method for use in an optical disc device comprising a pickup head, and optical disc device utilizing the method. The pickup head comprises an actuator equipped with an optical lens controlling laser focus on the optical disc, and the method comprises the following steps. The pickup head is first moved to a predetermined position, and determining a track error signal in the optical disc device. Providing a braking force to pre-deviate the optical lens when a flicker frequency of the track error signal exceeds a threshold, and keeping determining the flicker frequency. Delivering a track locking signal and storing control parameters of the pickup head to lock the laser focus on a destination track.

BRIEF DESCRIPTION OF THE DRAWINGS

The following detailed description, given by way of example and not intended to limit the invention solely to the embodiments described herein, will best be understood in conjunction with the accompanying drawings, wherein.

DETAILED DESCRIPTION

An embodiment of the invention provides a track locking method for use in an optical pickup head. The method pre-deviates an optical lens on an actuator before locking a track based on the flicker frequency of a track error signal detected by the optical pickup head. After track seeking in an optical disc device, if the relative speed of the optical pickup head and an optical disc is not within a range required by the track locking operation, a deviation force or braking force is applied to the optical lens of actuator for use as an initial state for the upcoming track locking operation. The concept is to pre-generate offsets, thus after track locking, the optical lens is positioned directly above the center of the optical pickup head. When another track seek and lock take place, the optical pickup head can accurately access a destination track.

Figure 5:
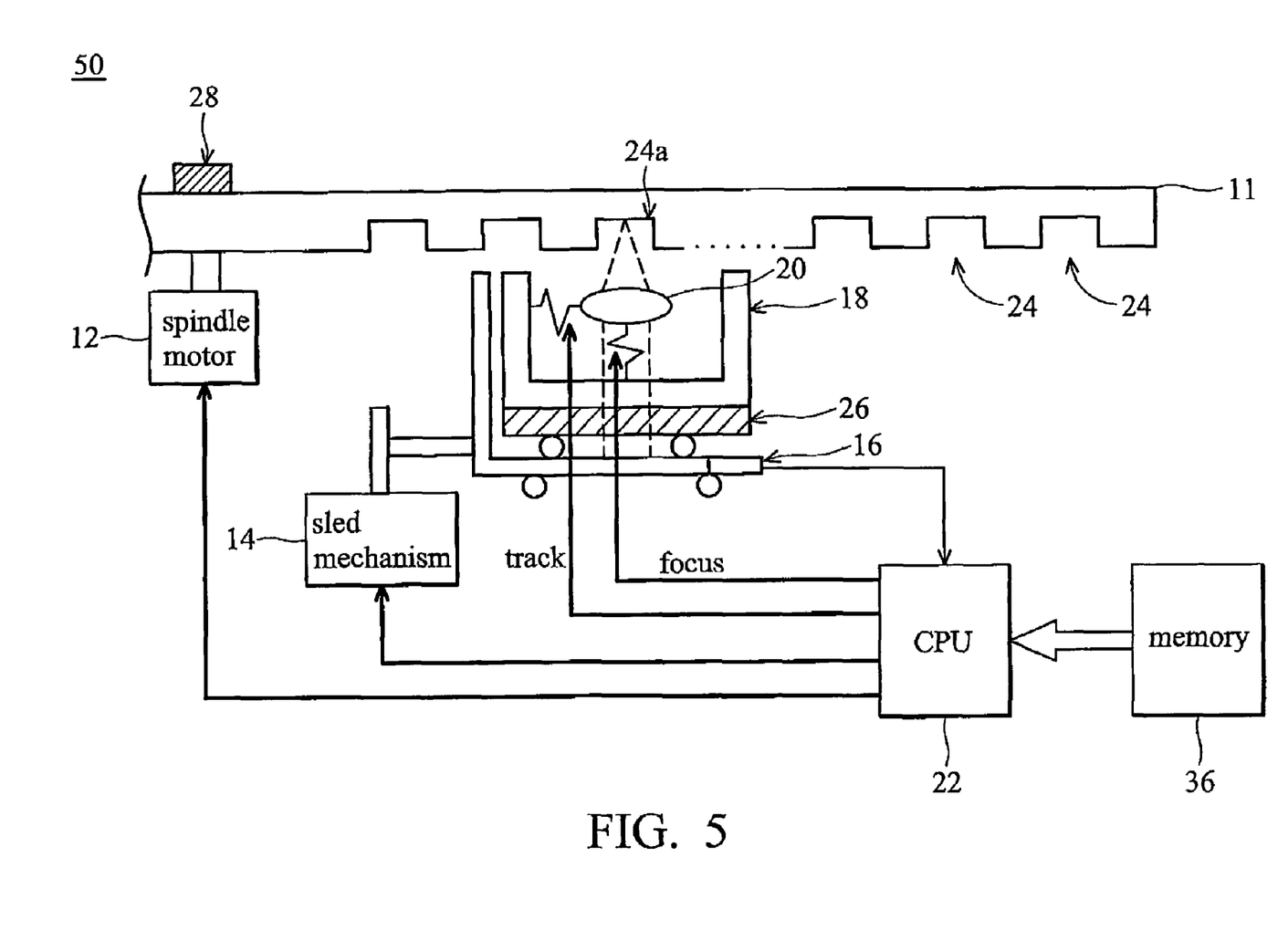
FIG. 5 is a block diagram of an optical disc device according to an embodiment of the invention.

FIG. 5 shows an optical disc device system according to an embodiment of the invention, with optical disc 11 is driven by spindle motor 12, sled mechanism 14 drives PUH 16 to move radially, wherein PUH 16 comprises an actuator 26 comprising optical lens 20, and the actuator 26 controls radial and axial movements of the optical lens 20 by magnetic coils. The PUH 16 also comprises a case 18 surrounding the optical lens 20 for protection. The CPU 22 coordinates the above components, and the memory 32 stores programs needed by CPU 22 for operation. In the embodiment, the track locking method for optical pickup head is implemented by programs stored in the memory 32. The actuator 26 is controlled by a track locking signal and a focus signal, focusing a laser on a destination track 24a of an optical disc 11. Through signals transmitted by optical lens 20, CPU 22 identifies relative movements between the laser focus and the optical disc 11, and flicker frequency of the movement.

Figure 6:
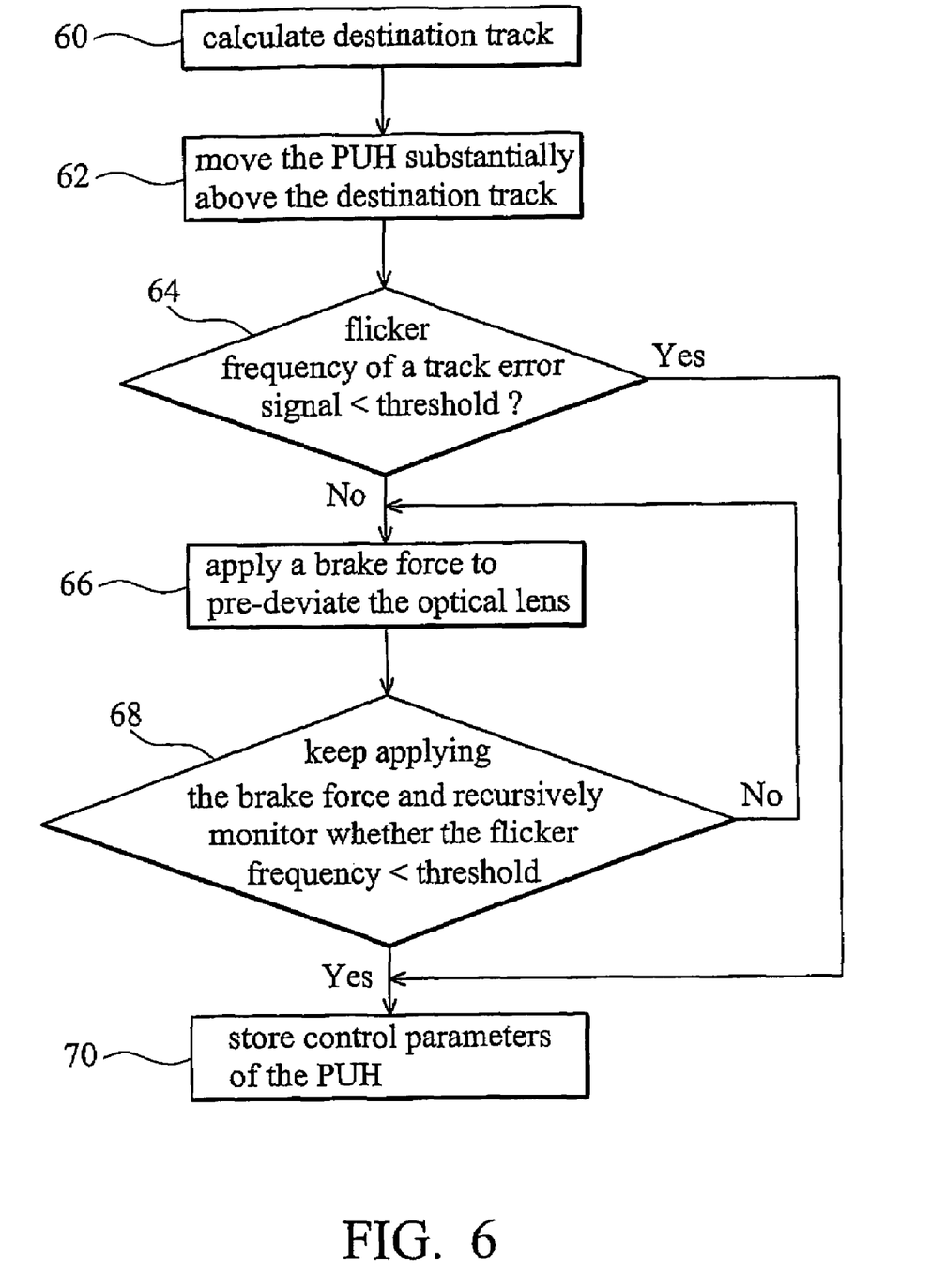
FIG. 6 is a flowchart of the track locking method.

FIG. 6 is a flowchart of the track locking method according to an embodiment of the invention. In step 60, a destination track 24a is selected through data allocation, and in step 62, the sled mechanism 14 moves the PUH 16 substantially above the destination track 24a, that ism moves the PUH 16 to a predetermined position. Steps 60 and 62 essentially constitute track seeking. Spindle motor 12 spins under control of CPU 22, operating with relative movement between the axis of optical disc 11 and PUH 16 caused by deviation generating flicker.

In step 64, a track error signal of the optical disc is detected; thereby track locking is executed according to the flicker frequency of the track error signal. If flicker frequency is low enough, for example, less than 13 kilohertz per second, the speed of relative movements between the optical disc and PUH 16 is low enough to proceed to step 70. Conversely, if the flicker frequency goes too high, more than 13 kilohertz per second, indicating the speed of relative movements between the optical disc and the PUH 16, track locking is unable to be performed, and the process goes to step 66. Flicker frequency meeting a threshold is the essential condition whether track locking can be performed, and the threshold is not limited to the embodiment here and can be designed according to practical system implementations, that is, the threshold is programmable.

In step 66, the actuator 26 pre-deviates optical lens 20 pre-deviated by applying a deviation force or a braking force thereon. The direction of deviation varies with the polarity of flicker frequency. As a problem the conventional method suffered, for example, when flicker frequency is positive due to the PUH 16 moving away from the axis 28 of the optical disc 11, track locking will cause optical lens 20 of actuator 26 to experience inward deviation. To solve the problem, in step 66, the optical lens 20 is pre-deviated outward by sending a track locking signal with a first value to the actuator 26, applying a braking force to pre-deviate the optical lens 20 outward. Conversely, when PUH 16 moves toward the axis 28 of the optical disc 11, track locking will cause the optical lens 20 of actuator 26 to experience an outward deviation, thus a track locking signal with a second value is sent to the actuator 26, applying a braking force to pre-deviate the optical lens 20 inward. Braking force can be designed according to practical system implementations or laboratory diagnosis.

In step 68, the flicker frequency is recursively determined. Unlike step 64, only when the flicker frequency is lower than the threshold, can the process go to step 70. During step 68, the braking force in step 66 is constantly applied to the optical lens 20.

In step 70, track locking is executed. Control parameters of the PUH 16 are stored, and appropriate track locking signals are delivered to keep the laser focus of PUH 16 tight with the destination track. A particular note is, step 68 and step 64 provide step 70 with different initial states, especially the track locking signal. When step 64 goes to step 70, the track locking signal is zero, and when step 68 goes to step 70, the value of track locking signal is the first value or the second value, such that corresponding braking force can be provided in step 66.

When the optical lens 20 deviates inward, after track seeking, if flicker frequency is determined to exceed the threshold, the track locking signal is set to a first value. As a result, a braking force is applied to optical lens 20 to pre-deviate outward. And the flicker frequency determination keeps running. When flicker frequency is lower than the threshold, track locking is executed with a braking force corresponding to the first value. Identically, when the optical lens 20 deviates outward, after track seeking, if flicker frequency exceeds the threshold, the track locking signal is set to a second value. As a result, a braking force is applied to optical lens 20 to pre-deviate inward. And the flicker frequency determination keeps running. When flicker frequency is lower than the threshold, the track locking is executed with the braking force corresponding to the second value.

Figure 7:
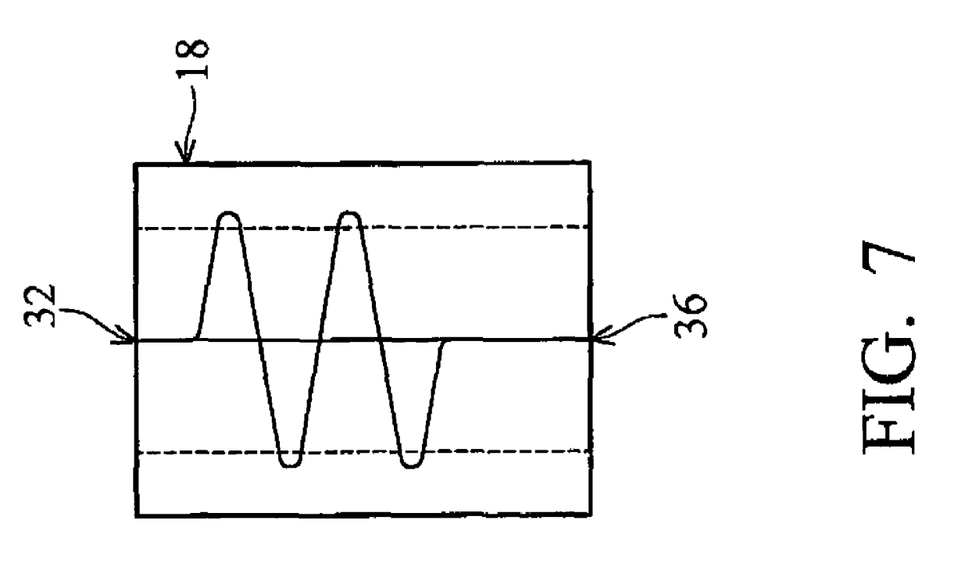
FIG. 7 shows the vibration of the optical lens according to an embodiment of the invention.

FIG. 7 shows the track vibration of the optical lens according to the embodiment of the invention. The optical lens 20 accurately vibrates around the center 36 in the case 18. The deviation of the optical lens is eliminated. According to the described embodiments of the invention, inward and deviation effects are prevented by previously applying a braking force as an initial state of the track locking operation. Contrary to the prior art, no complicated logic control circuits are needed for implementation, which is economic and efficient.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for locking a track in an optical disc device containing a pickup head and an optical lens, comprising:
   moving the pickup head to a predetermined position;
   determining a track error signal in the optical disc device; and
   when a flicker frequency of the determined track error signal exceeds a threshold frequency value, pre-deviating the optical lens.

2. The method of claim 1, wherein the threshold frequency value is 13 kilohertz.

3. The method of claim 1, wherein pre-deviating the optical lens includes applying a braking force to the optical lens to adjust a position of the optical lens.

4. A system for controlling an optical disc device, comprising:
   a signal detection component that detects a flicker frequency of a track error signal; and
   a lens adjustment component that adjusts an optical lens configured to focus a laser on a track of an optical disc within the optical disc device based on the detected flicker frequency.

5. The system of claim 4, wherein the lens adjustment component includes an actuator that applies an adjustment force to the optical lens.

6. The system of claim 4, wherein the lens adjustment component includes an actuator that applies a braking force to the optical lens.

7. The system of claim 4, further comprising:
   a track locking component that maintains the adjustment of the optical lens based on the detected flicker frequency.

8. A method in an optical disc device for modifying a focus of an optical lens that controls a laser configured to read from an optical disc within the device, comprising:
   receiving a selection of a track located on the optical disc;
   moving a pickup head to a location at least approximately above the selected track;

measuring a track error signal associated with the location of the pickup head relative to the selected track;

comparing a flicker frequency of the track error signal to a threshold value; and when the flicker frequency exceeds the threshold value, adjusting an optical lens within the pickup head.

9. The method of claim 8, wherein adjusting the optical lens includes positioning the optical lens outwards from the axis of rotation of the optical disc.

10. The method of claim 8, wherein adjusting the optical lens includes positioning the optical lens inwards from the axis of rotation of the optical disc.

11. The method of claim 8, further comprising:

locking the optical lens in position only after adjusting the optical lens.

12. A system in an optical disc device for modifying a focus of an optical lens that controls a laser configured to read from an optical disc within the device, comprising:

means for receiving a selection of a track located on the optical disc;

means for moving a pickup head to a location at least approximately above the selected track;

means for measuring a track error signal associated with the location of the pickup head relative to the selected track;

means for comparing a flicker frequency of the track error signal to a threshold value; and means for adjusting an optical lens within the pickup head when the flicker frequency exceeds the threshold value.

13. The system of claim 12, further comprising:

means for locking the optical lens in position after adjusting the optical lens.

14. A method for controlling an optical disc reader, comprising:

measuring a speed of rotation of an optical disc within the optical disc reader relative to a pickup head of the optical disc reader;

adjusting a position of an optical lens within the pickup head when the measured speed of rotation exceeds a threshold speed; and locking the optical lens in the adjusted position.

15. The method of claim 14, wherein measuring a speed of rotation includes measuring a flicker frequency.

16. The method of claim 14, wherein measuring a speed of rotation includes detecting a value for a track error signal.

* * * * *

UNITED STATES PATENT AND TRADEMARK OFFICE
CERTIFICATE OF CORRECTION

| | | |
|---|---|---|
| PATENT NO. | : 7,652,958 B2 | Page 1 of 1 |
| APPLICATION NO. | : 11/039309 | |
| DATED | : January 26, 2010 | |
| INVENTOR(S) | : Ronnie Lai | |

It is certified that error appears in the above-identified patent and that said Letters Patent is hereby corrected as shown below:

On Title page, in field 30, in column 1, under "Foreign Application Priority Data", line 1, delete "93101496 A" and insert -- 93101496 --, therefor.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,652,958 B2
APPLICATION NO. : 11/039309
DATED : January 26, 2010
INVENTOR(S) : Ronnie Lai Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Twenty-third Day of November, 2010

David J. Kappos
*Director of the United States Patent and Trademark Office*